June 26, 1962　　　A. SMITH ET AL　　　3,040,502
TRACTOR MOWER
Filed March 13, 1959　　　　　　　　　　　　2 Sheets-Sheet 1
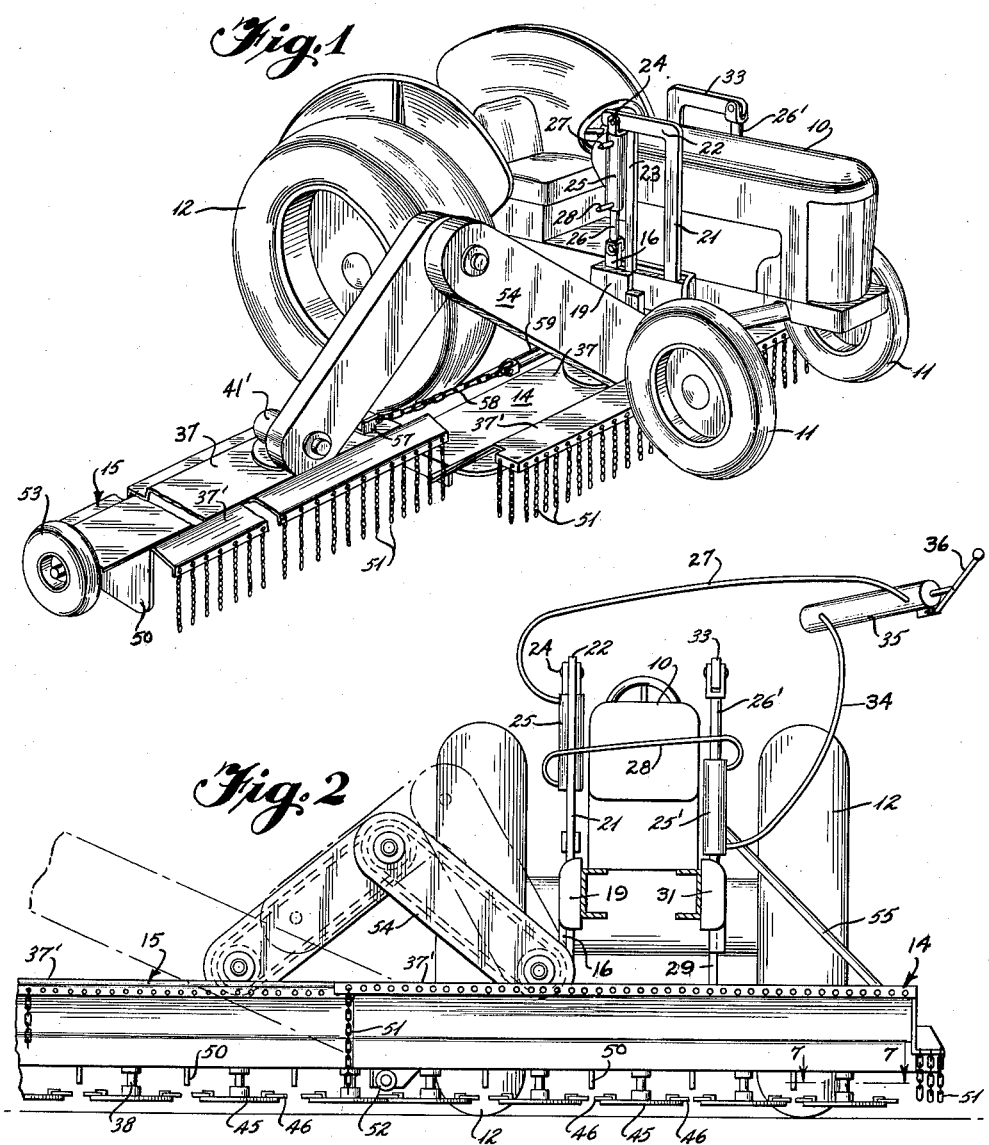
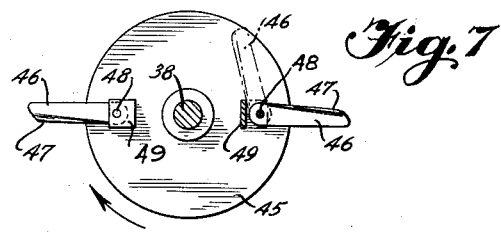
INVENTORS
Alexander Smith &
B.D. Baggs, Jr.
BY
ATTORNEY

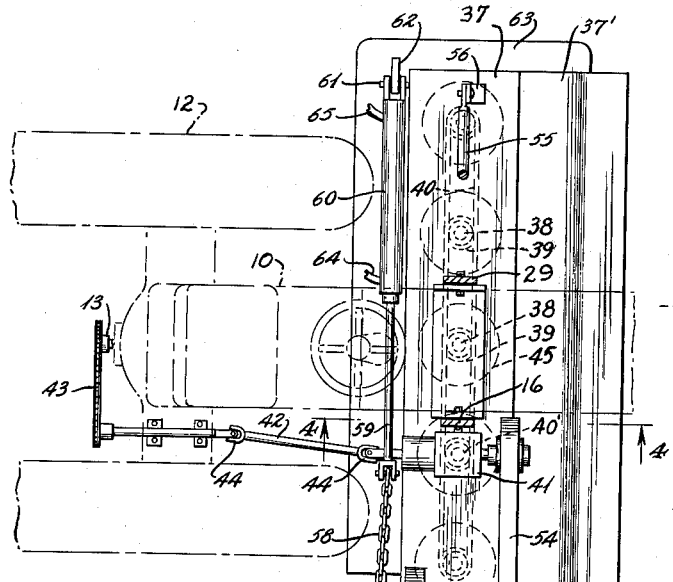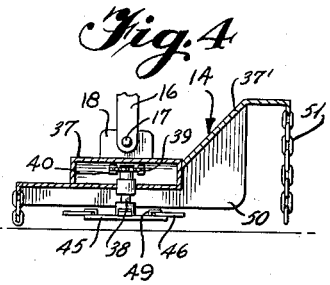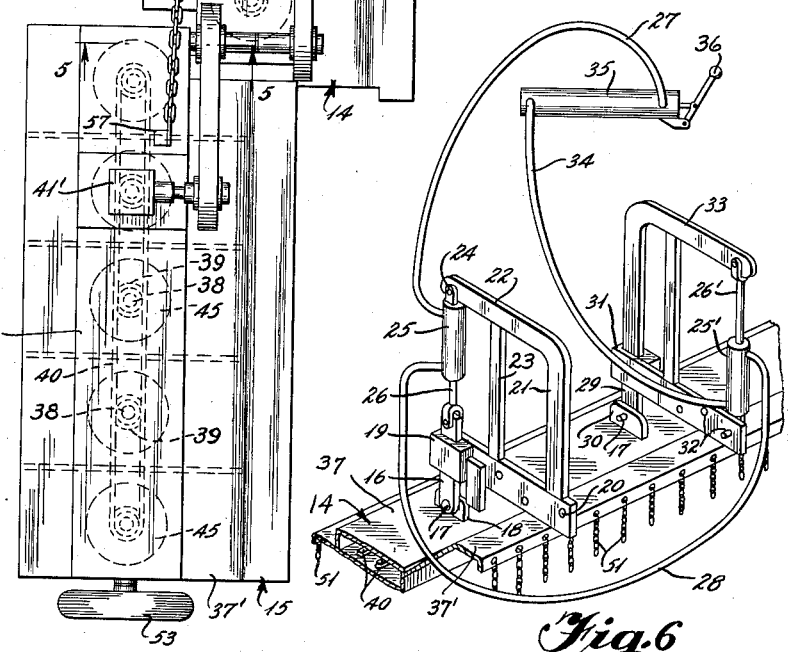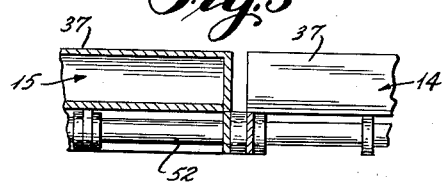

3,040,502
TRACTOR MOWER
Alexander Smith, Box 1460, and Burton D. Baggs, Jr., 2429 Laurel Ave., both of Sanford, Fla.
Filed Mar. 13, 1959, Ser. No. 799,335
8 Claims. (Cl. 56—6)

This invention relates to the care and cultivation of the soil including grass and other vegetation along the highways and in other places and to equipment employed in caring for such vegetation including mowers usable along highways and places where it is desired to cut a relatively wide swathe at one passage whether in a single or dual planes.

The invention relates particularly to a mower which can be attached to a tractor or other self-propelled vehicle and composed of a generally horizontal portion which can be raised and lowered and an extension connected by a hinge to the end of the first so that it can be adjusted angularly by swinging it about such hinge.

Mowers heretofore produced have lacked certain features that are desirable including the capacity for cutting a relatively wide swathe at one pass, and desirable adjustment both as to height and angularity. Also they were frail, lacked the desired strength and durability, were expensive, complicated, and easy to get out of order.

It is an object of the invention to overcome the difficulties enumerated and to provide a mower which can be attached to a tractor or other self-propelled vehicle and raised, lowered and adjusted angularly to cut grass and other growth simultaneously along a flat surface, an inclined bank or both, as well as a mower which is relatively strong, durable, and will not be injured on the cutters stopped by contact with heavy growth, as well as a mower in which the cutters may rest on the ground and continue to cut.

Another object of the invention is to provide a mower which can be applied to and driven from the power take-off of a conventional tractor, the mower including a primary portion which can be suspended transversely beneath the tractor and with a secondary or extension mower pivoted or hinged to the end of the first so it can be raised and lowered with the first mower and swung at an angle thereto, but with the cutters of the first and second mowers overlapping so they do not leave an uncut strip therebetween.

A further object of the invention is to provide a primary mower mounting a secondary mower at one end by means of a hinge with the primary mower adapted to be mounted beneath a self-propelled vehicle and with the secondary mower extending laterally to one side of such vehicle so that by the use of both of the mowers a relatively wide swathe can be cut, the mowers having similar cutters in the form of relatively large disks which can be lowered into contact with the earth and on the upper surface of which disks are diametrically opposed loosely pivoted cutters with thin airlift trailing edges so that when the cutters are idle they may be disposed within the outer circle of the disk but when rotated they may swing outwardly by centrifugal force and perform the cutting and airlifting operations and due to the size of the disks clogging and stoppage is avoided.

A further object of the invention is to provide a mower in which the operation of the cutters is not affected by the angularity of the secondary or extension mower and in which each of the mowers is provided on its underside with partition members parallel to the direction of the movement of the tractor, which partition members prevent the movement by the rapidly rotating cutters of the cut growth outwardly from the vehicle toward the ends of the primary and secondary cutters into a windrow.

A further object of the invention is to provide a mower in which the drive is not affected by the angularity of the extension mower and each mower is provided with partition members parallel to the direction of movement of the vehicle and which prevent the growth cut from being moved outwardly from the vehicle towards the ends of the primary and secondary mowers into a windrow.

Other objects and advantages of the invention will be apparent from the following description taken in conjunction with the accompanying drawings, wherein:

FIG. 1 is a perspective illustrating one application of the invention applied to a conventional tractor;
FIG. 2, a front elevation of the device of FIG. 1 with the forward portion of the tractor broken away;
FIG. 3, a top plan view of the invention of FIG. 1;
FIG. 4, a section on the line 4—4 of FIG. 3;
FIG. 5, a section on the line 5—5 of FIG. 3;
FIG. 6, a perspective of the mounting means for the first cutter; and
FIG. 7, a section on the line 7—7 of FIG. 2.

Briefly stated the present invention comprises a primary mower unit underslung centrally and transversely beneath a tractor having front and rear wheels, and a secondary mower with the end of the secondary mower connected by a hinge to the end of the first mower so that the secondary mower may be raised and lowered to cut an an angle to the primary mower. The mounting of the mowers is such that they may cut from 1½" above the earth to several inches thereabove, and the raising and lowering of the primary and secondary mower units being accomplished hydraulically. The mowers are in the form of elongated housings in which chains drive sprockets attached to spaced vertical shafts on the lower end of each of which is a cutter in the form of a relatively large disk. Opposed elongated loosely pivoted cutters with thin leading edges and airlift trailing edges are mounted diametrically opposite each other on the disks and with each mower having an outwardly and upwardly inclined surface for directing growth downwardly into contact with the cutters and with closely spaced depending guard chains to prevent objects striking the cutter from being projected in a manner to injure persons and property.

With continued reference to the drawings, a tractor 10 is provided with front and rear wheels 11 and 12 and a power take-off 13. Beneath the tractor is mounted a primary mower unit 14 and to one end of this is hinged the end of a secondary mower unit 15. The primary mower unit may be of any desired length as, for example, nine feet long and the secondary mower unit may be somewhat less in length, as, for example, seven feet.

The primary mower unit is mounted so it may be raised and lowered, having attached on the right side of the tractor a mounting bar 16 secured by bolts or other fasteners 17 to an upstanding mounting plate or flange 18. The mounting bar 16 extends through a slide block 19 attached by means of bolts 20 to the tractor and which slide block has an upright bracket 21 with a horizontal upper portion 22 and a support 23. The horizontal portion of the bracket 21 overlies the mounting bar 16 and interposed between such mounting bar and such overlying bracket portion 22 are secured, by bolts 24, the ends of a hydraulic cylinder 25 and piston 26 with such cylinder having fluid lines 27 and 28 to raise and lower one end of the primary mower unit 14.

At the opposite side of the tractor a mounting bar 29 is attached by bolts 17 to a mounting flange 30 spaced along or lengthwise of the mower from the first mounting flange 18, such mounting bar 29 being located in a slide block 31 fastened to the frame of the tractor by means of bolts 32. The mounting bar 29 has a curved upper end 33 connected to the upper end of a piston 26' which extends into a cylinder 25', the opposite end of which is mounted on the slide block 31 to raise and lower the other end of the primary mower unit 14. Cylinder 25' is connected to cylinder 25 by the line 28, and has a second line 34 which connects with a distribution valve 35 to which the line 27 also is connected.

The two cylinders 25 and 25' work in series and distribution valve 35 having a handle 36 controls the operation of both cylinders to provide for the raising and lowering of the primary mower unit with one end of such mower unit being raised or lowered ahead of the other.

Each mower unit includes a housing 37 with a series of vertical shafts 38 mounted therein. A sprocket 39 is mounted on the upper extremity of each of the shafts 38 and such sprockets are driven by a chain 40. Chain 40 is driven by a shaft 40' from a gear box 41 into which one end of a drive shaft 42 extends. The opposite or rear end of such drive shaft is driven by a chain 43 from the power take-off 13 and is provided with universal joints 44 to compensate for the raising and lowering movement of the mower and the gear box 41 thereon.

On the lower ends of each of the vertical shafts 38, at right angles to the shaft, is mounted a metal disk 45, such disks being substantially in the same horizontal plane. These disks are relatively large, for example, 10 inches in diameter, so that they may be lowered into contact with the earth. On the upper surfaces of each of these disks are two diametrically opposed loosely pivoted cutters 46 with thin leading edges and angular airlift trailing edges 47. The cutters 46 are mounted on pivots 48, the axis of which are upright, having their lower ends secured to the disks and their upper ends attached to supporting brackets 49 so that each side of the cutter is supported. When the disks are rotated at high speed, cutters are swung by centrifugal force and perform the cutting and airlifting operation on the material to be cut. Due to the diameter of the disks, there is no clogging and the cutters are mounted inwardly of the peripheries of the disks sufficiently to permit them to collapse within such peripheral area upon striking an obstruction or solid body.

Thus, a rugged durable structure is provided and due to the rotation of the disks at relatively high speed the cutters will readily cut growth in their path.

The housing 37 is provided with a forwardly and upwardly inclined surface 37' to direct growth into the cutters. A plurality of depending separators 50 in the form of strips or plates are welded or otherwise attached beneath the housing 37 and inclined surface 37' and extend parallel with the direction of travel to prevent the cut material from being thrown from one cutter to the next. This prevents creation of a windrow at the outer end of the mower unit and facilitates even cutting.

Each mower unit is provided at its front and rear with closely spaced lengths of chain 51 to intercept any object, such as a stone or can, projected by the cutters, thereby to prevent injury to persons or property. A hinge 52 is located adjacent one end of the primary mower unit 14 and on such hinge the end of the secondary mower unit is pivoted in staggered relation thereto in such a manner that the end cutter of the secondary mower substantially overlaps the end cutter of the primary mower in order not to leave an uncut strip, said second mower being similar in construction to the first except that its remote end is provided with a support, such as a wheel 53. The cutters of the secondary unit are driven from a gear box 41' by means of an elbow drive 54 which allows the independent pivoting of the secondary mower about the hinge 52. The primary mower is provided with a brace 55 on its remote side between the upper portion of the mounting bar 29 and a bracket 56 on the housing 37 to support the mower due to the unequal distribution of weight caused by the mounting of the secondary mower on the end of the housing at the opposite side of the tractor.

In order to raise and lower the outer end of the secondary mower, the inner end of which is hinged to the primary mower, a bracket 57 is provided on the upper surface of the second mower and to this bracket is connected a chain 58 which extends along the rear of the first mower and is connected to the piston 59 of a hydraulic cylinder 60. The remote end of such cylinder is pivotally mounted by a pin 61 to a bracket 62 attached to the end 63 of the primary mower remote from the secondary unit so that hydraulic force within the cylinder can be applied by fluid lines 64 and 65 to extend or retract the chain and raise and lower the second unit. When the units are in level position, the chain has approximately a 7 inch slack to allow the secondary unit to swing down and pass over a bank.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A mower attachment for a tractor comprising an elongated first mower frame having first mower means thereon, vertical adjusting and stabilizing means thereon adapted for attachment to the tractor, drive means connected to said first mower means and adapted for connection to the power takeoff of the tractor, a second mower frame forming an extension of and having pivotal connection with said first mower frame and having second mowing means thereon, and an elbow drive connection between said first and second mowing means.

2. The structure of claim 1 in which said first mower means includes spaced vertical shafts and a relatively large disk on the lower end of each of said shafts.

3. The structure of claim 1 in which said first mower means includes spaced vertical shafts, a relatively large disk on the lower end of each of said shafts, one or more cutters freely pivoted on the upper surface of each of said disks whereby when the disks engage the earth said cutters will be free.

4. The structure of claim 1, in which said mower means includes relatively rotatable surfaces in a substantially horizontal plane cutters having thin leading edges and angular airlift trailing edges and being adapted to be swung outwardly by centrifugal force to elevate material to be cut into position to be engaged by said cutters.

5. The structure of claim 1 and control means by which the raising and lowering of said first mower means may be accomplished.

6. The structure of claim 1 and guarding means along said mowers guarding against the projection of objects struck by said mower means.

7. The structure of claim 1, and means for controlling the angularity of the second mower means relative to the first mower means.

8. The structure of claim 1, and means for individually controlling the opposite ends of said first mower means.

References Cited in the file of this patent

UNITED STATES PATENTS

| | | |
|---|---|---|
| 2,682,740 | Miller et al. | July 6, 1954 |
| 2,711,624 | Crump | June 28, 1955 |
| 2,763,977 | Spencer et al. | Sept. 25, 1956 |
| 2,777,272 | Smith et al. | Jan. 15, 1957 |
| 2,801,510 | Colburn | Aug. 6, 1957 |
| 2,815,634 | Bush | Dec. 10, 1957 |
| 2,856,747 | Kolls | Oct. 21, 1958 |
| 2,862,343 | Wood | Dec. 2, 1958 |